United States Patent
Jiang (10) Patent No.: US 8,081,648 B2
(45) Date of Patent: Dec. 20, 2011

(54) METHOD AND APPARATUS FOR HANDLING RESET IN A WIRELESS COMMUNICATIONS SYSTEM

(75) Inventor: Sam Shiaw-Shiang Jiang, Taipei (TW)

(73) Assignee: Innovative Sonic Limited, Port Louis (MU)

(*) Notice: Subject to any disclaimer, the term of this patent is extended or adjusted under 35 U.S.C. 154(b) by 926 days.

(21) Appl. No.: 12/007,341

(22) Filed: Jan. 9, 2008

(65) Prior Publication Data
US 2008/0166970 A1 Jul. 10, 2008

Related U.S. Application Data

(60) Provisional application No. 60/884,201, filed on Jan. 9, 2007.

(51) Int. Cl.
*H04L 12/28* (2006.01)

(52) U.S. Cl. ........................................................ 370/431

(58) Field of Classification Search ........... 370/431–463
See application file for complete search history.

(56) References Cited

U.S. PATENT DOCUMENTS

| | | | | |
|---|---|---|---|---|
| 6,084,513 A * | 7/2000 | Stoffer | | 340/572.2 |
| 6,448,572 B1 * | 9/2002 | Tennant et al. | | 250/559.38 |
| 7,286,563 B2 * | 10/2007 | Chang et al. | | 370/469 |
| 7,388,883 B2 * | 6/2008 | Jiang | | 370/470 |
| 7,512,112 B2 * | 3/2009 | Jiang | | 370/350 |
| 2004/0076182 A1 * | 4/2004 | Wu | | 370/469 |
| 2007/0104109 A1 * | 5/2007 | Jiang | | 370/244 |
| 2007/0183328 A1 * | 8/2007 | Jiang | | 370/232 |
| 2007/0258489 A1 * | 11/2007 | Jiang | | 370/479 |
| 2008/0101608 A1 * | 5/2008 | Jiang et al. | | 380/270 |
| 2008/0166970 A1 * | 7/2008 | Jiang | | 455/63.1 |

FOREIGN PATENT DOCUMENTS

| | | |
|---|---|---|
| JP | 2003111147 A | 4/2003 |
| JP | 200565289 A | 3/2005 |
| JP | 2007129723 A | 5/2007 |
| KR | 1020070048630 A | 5/2007 |

OTHER PUBLICATIONS

3GPP TS 25.322 V7.2.0 (Sep. 2006), "Radio Link Control (RLC) protocol specification (Release 7)", pp. 1-86.
ETSI TS 125 322 V6.9.0 (Sep. 2006), Universal Mobile Telecommunications system (UMTS); Radio Link Control (RLC) protocol Specification (3GPP TS 25.322 version 6.9.0 Release 6), p. 1/55-57.

(Continued)

*Primary Examiner* — Chi Pham
*Assistant Examiner* — Fan Ng
(74) *Attorney, Agent, or Firm* — Klein, O'Neill & Singh, LLP (57) ABSTRACT

A method for handing reset in a first communications device of a wireless communications system is disclosed. The first communications device includes a first transmitter and a receiver. The method includes receiving a packet from a second communications device by the receiver, triggering a reset procedure by the receiver when a protocol error is detected by the receiver according to the packet, and resetting the receiver and not resetting the first transmitter after the reset procedure is triggered.

18 Claims, 5 Drawing Sheets

OTHER PUBLICATIONS

Summary of Koutaiiki-Idou-Access-System (Broadband Mobile Access Communication System) (HiSWANa), Standard Specification, ARIB, STD-T70, version 3.1, Japan, Shadan-Houjin-Dempa-Sangyou-Kai (ARIB, Association of Radio Industries and Businesses), Nov. 30, 2005, pp. 125-135.

Ericsson: "Reset handling", 3GPP TSG RAN WG2 #17, TSG R2-002272, Nov. 13-17, 2000, XP050116615, Sophia Antipolis, France.

NTT DOCOMO; "Proposed CR on modification of Reset/Reset ACK PDU", TSG-RAN Working Group 2 meeting #10, TSGR2#10(00)0109, Jan. 17-21, 2000, total 8 pages, XP050114578, San Diego, CA, USA (including NTT DODOMO: "Modification of Reset PDU and Reset ACK PDU", 3GPP TSG RAN WG2 meeting #10, R2-000109, Jan. 17-21, 2000, ZP050114578, San Diego, USA).

Asustek: "Content of retransmitted Reset ACK PDU", TSG-RAN WG2 meeting #25, R2-012655, Nov. 26-30, 2001, pp. 1-6 and pp. 60-62, XP050119448, Makuhari, Japan.

Ericsson: Proposed changes to 25.322 "RLC specification", TSG-RAN Working Group 2 (Radio layer 2 and Radio layer 3, TSGR2#5(99)562, Jul. 5-9, 1999, pp. 1-6, XP050112904, Sophia Antipolis.

Samsung: "Erroneous LI and RLC Reset Procedure", 3GPP TSG RAN WG2 #37, Tdoc R2-031831, Aug. 25-29, 2003, total 9 pages, XP050124163, Budapest, Hungary (including Samsung; "Defining Erroneous LI as a RLC Reset Indicator", 3GPP TSG RAN WG2 #37, Tdoc R2-031831, Aug. 25-29, 2003, XP 050124163, Budpest, Hungary).

The extended search report of corresponding foreign application (EP 08000303.1) from the European Patent Office dated Nov. 9, 2010.

* cited by examiner

METHOD AND APPARATUS FOR HANDLING RESET IN A WIRELESS COMMUNICATIONS SYSTEM

CROSS REFERENCE TO RELATED APPLICATIONS

This application claims the benefit of U.S. Provisional Application No. 60/884,201, filed on Jan. 9, 2007 and entitled "Method and Apparatus for Single-Sided RLC Reset Procedure triggered by receiver," the contents of which are incorporated herein by reference.

BACKGROUND OF THE INVENTION

1. Field of the Invention

The present invention relates to a method and apparatus for handling reset in a wireless communications system, and more particularly, to a method and apparatus for accurately handling protocol errors, enhancing transmission efficiency, and preventing unnecessary PDU discard.

2. Description of the Prior Art

The third generation (3G) mobile communications system has adopted a Wideband Code Division Multiple Access (WCDMA) wireless air interface access method for a cellular network. WCDMA can provide high frequency spectrum utilization, universal coverage, and high quality, high speed multimedia data transmission. The WCDMA method also meets all kinds of QoS requirements simultaneously, providing diverse flexible two-way transmission services and better communication quality to reduce transmission interruption rates.

The Access Stratum (AS) of the 3G mobile communications system comprises various protocol stacks, such as Radio Resource Control (RRC), Radio Link Control (RLC), Media Access Control (MAC), Packet Data Convergence Protocol (PDCP), and Broadcast/Multicast Control (BMC). In addition, the 3G mobile communications system also provides different levels of transmission quality, and can operate in different corresponding modes according to different transmission quality requirements, such as: Transparent Mode (TM), Unacknowledged Mode (UM), and Acknowledged Mode (AM).

A protocol layer, such as RLC or PDCP, consists of a transmitting side and a receiving side. The transmitting side and the receiving side each process transmission and reception through the RLC layer, and both sides can share system resources. For example, uplink (UL) transmission is performed by the transmitting side of a UE (user equipment) and the receiving side of the network, while downlink (DL) transmission is performed by the receiving side of the UE and the transmitting side of the network.

In order to maintain data accuracy in AM, when a protocol error is detected, a reset procedure is executed, and a principle for determining the protocol error is according to whether the RLC entity of the transmitter detects one of the three following conditions:

Condition 1: "No discard after MaxDAT number of transmissions" mode is configured, and a variable VT(DAT) is equal to a parameter MaxDAT, and then the RLC reset procedure will be executed. The variable VT(DAT) indicates a number of times an AM PDU (Acknowledgement Mode Protocol Data Unit) has been scheduled for transmission, while the parameter MaxDAT indicates an upper limit of VT(DAT).

Condition 2: A variable VT(MRW) is equal to a parameter MaxMRW. The variable VT(MRW) indicates a number of times a Move Receiving Window (MRW) command has been transmitted, while the parameter MaxMRW indicates an upper limit of VT(MRW).

Condition 3: A STATUS PDU reported by the receiver to the transmitter or a piggybacked STATUS PDU contains an erroneous sequence number, such as a sequence number reported as missing that has already been acknowledged as received, or a sequence number reported as received that has not yet been transmitted by the transmitter.

Note that, all the three conditions are events on the transmitting side of an RLC entity. For UE, the events are on the uplink, and for the network, the events are on the downlink. After the reset procedure is triggered, the transmitting side and the receiving side are reset, data transmission are stopped, DL HFN (Hyper Frame Number) and UL HFN values are exchanged between the peer entities, PDUs in the receiving side are discarded, SDUs that were transmitted in the transmitting side are discarded, state variables are reset, and then the data transmission restarts. Therefore, the RLC reset procedure is time consuming and it causes data loss.

SUMMARY OF THE INVENTION

According to the present invention, a method for handing reset in a first communications device of a wireless communications system is disclosed. The first communications device comprises a first transmitter and a receiver. The method comprises receiving a packet from a second communications device by the receiver, triggering a reset procedure by the receiver when a protocol error is detected by the receiver according to the packet, and resetting the receiver and not resetting the first transmitter after the reset procedure is triggered.

According to the present invention, a first communications device of a wireless communications system utilized for accurately handling reset comprises a control circuit for realizing functions of the communications device, a processor installed in the control circuit for executing a program code to operate the control circuit, and a memory coupled to the processor for storing the program code. The program code comprises forming a first transmitter and a receiver, receiving a packet from a second communications device by the receiver, triggering a reset procedure by the receiver when a protocol error is detected by the receiver according to the packet, and resetting the receiver and not resetting the first transmitter after the reset procedure is triggered.

According to the present invention, a method for handing reset in a first communications device of a wireless communications system is disclosed. The first communications device comprises a transmitter and a receiver. The method comprises outputting a packet to a second communications device by the transmitter, and resetting the transmitter and not resetting the receiver when receiving a reset request packet from the second communications device.

According to the present invention, a first communications device of a wireless communications system utilized for accurately handling reset comprises a control circuit for realizing functions of the communications device, a processor installed in the control circuit for executing a program code to operate the control circuit, and a memory coupled to the processor for storing the program code. The program code comprises forming a transmitter and a receiver, outputting a packet to a second communications device by the transmitter, and resetting the transmitter and not resetting the receiver when receiving a reset request packet from the second communications device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
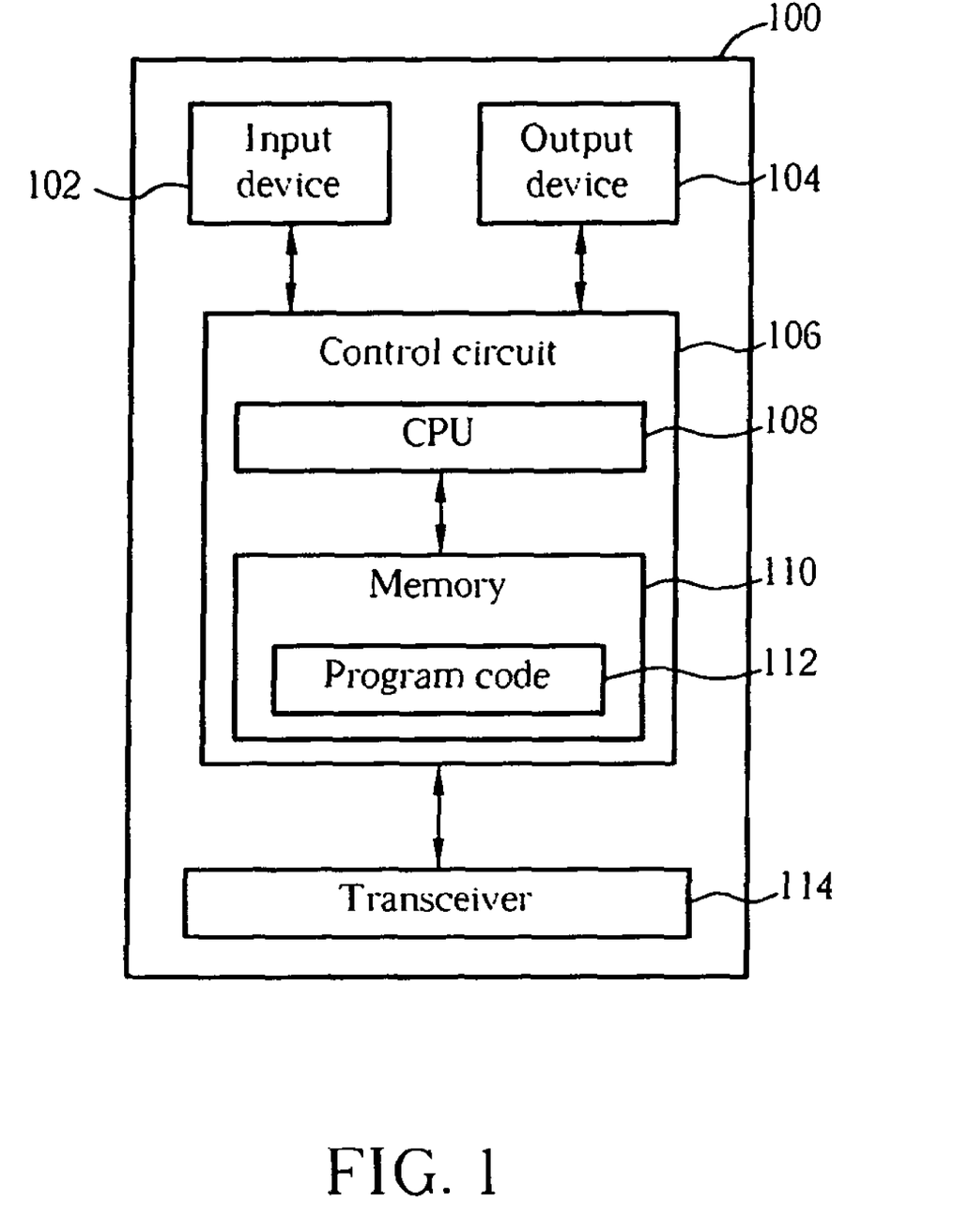
FIG. 1 is a function block diagram of a wireless communications device.

Please refer to FIG. 1, which is a functional block diagram of a communications device 100. For the sake of brevity, FIG. 1 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3.

Figure 2:
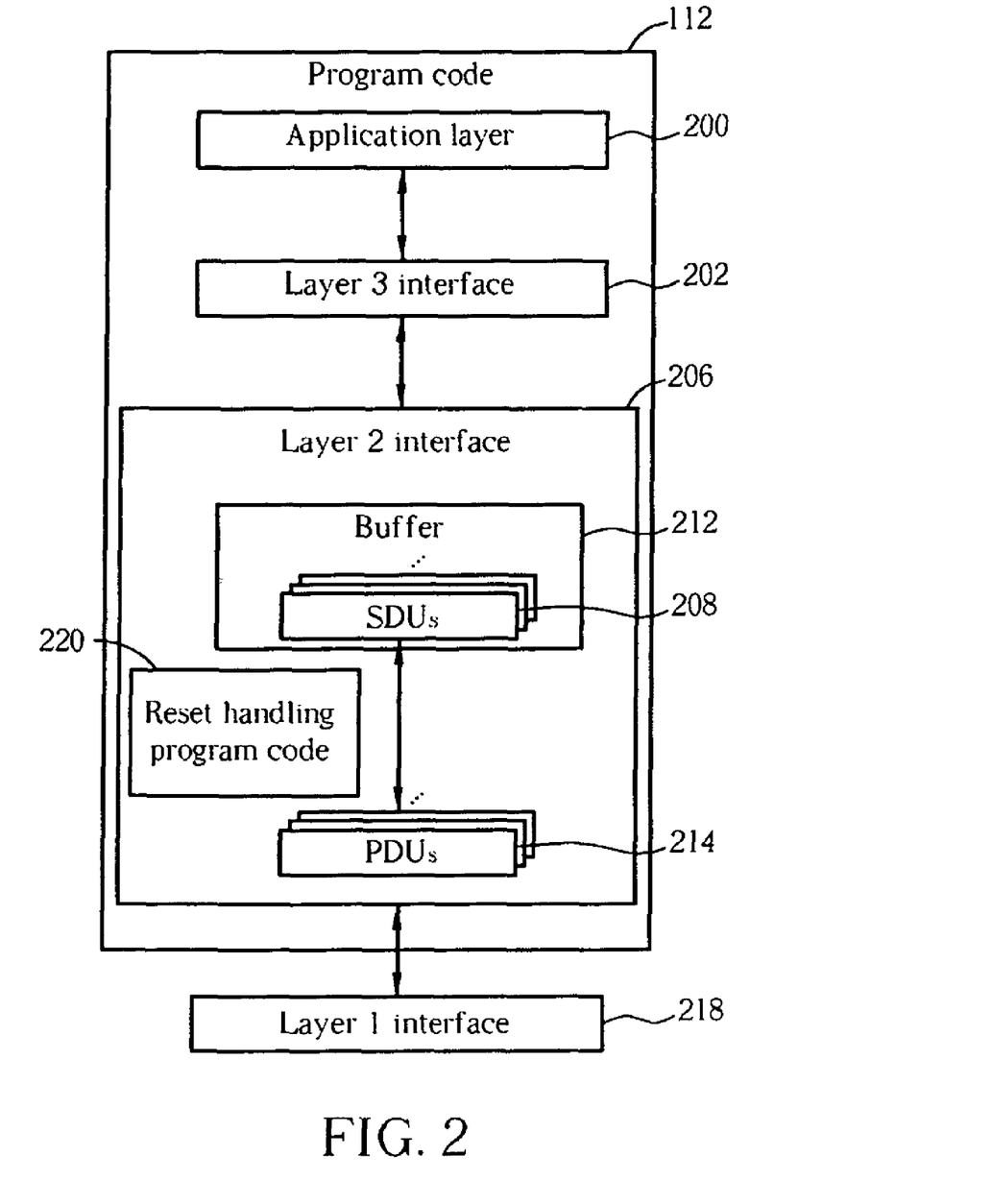
FIG. 2 is a diagram of program code of FIG. 1.

Please continue to refer to FIG. 2. FIG. 2 is a diagram of the program code 112 shown in FIG. 1. The program code 112 comprises an application layer 200, a Layer 3 interface 202, and a Layer 2 interface 206, and is coupled to a Layer 1 interface 218. When a signal is transmitted, the Layer 2 interface 206 forms a plurality of SDUs 208 according to data submitted by the Layer 3 interface 202, and stores the plurality of SDUs 208 in a buffer 212. Then, based on the SDUs 208 stored in the buffer 212, the Layer 2 interface 206 generates a plurality of PDUs 214, and sends the plurality of PDUs 214 to a destination terminal through the Layer 1 interface 218. In contrast, when a wireless signal is received, the signal is received through the Layer 1 interface 218, then delivered as PDUs 214 to the Layer 2 interface 206. The Layer 2 interface 206 restores the PDUs 214 to SDUs 208 and stores the SDUs 208 in the buffer 212. Last, the Layer 2 interface 206 delivers the SDUs 208 stored in the buffer 212 to the Layer 3 interface 202.

The Layer 2 interface 206 is a combination of the transmitting side and the receiving side. The transmitting side and the receiving side respectively represent the transmitting and receiving portions of the protocol layer, i.e. the Layer 2 206, such as an RLC layer. In such a situation, the embodiment of the present invention provides a reset handling program code 220 for timely trigger the reset procedure, so as to recover protocol errors.

Figure 3:
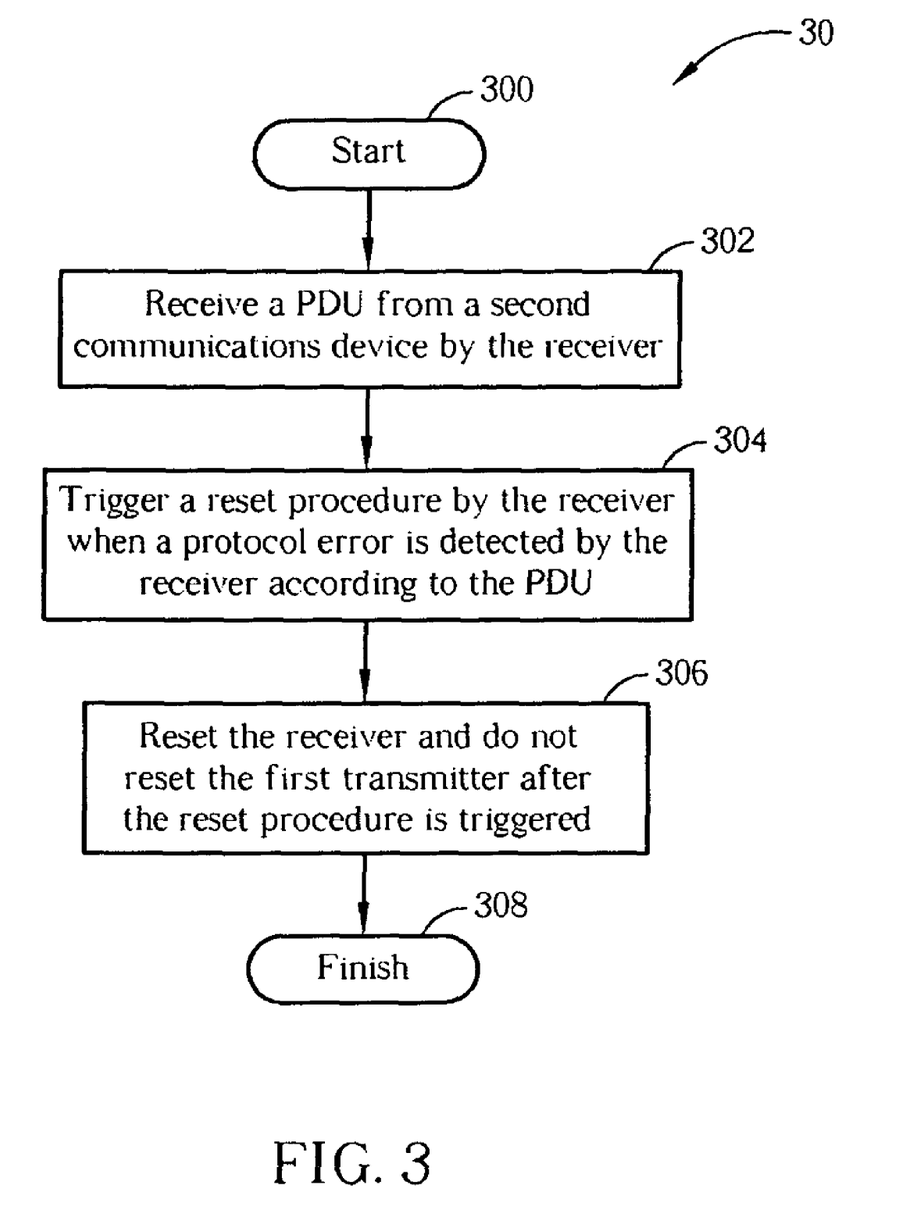
FIG. 3 is a flowchart of a process according to an embodiment of the present invention.

Please refer to FIG. 3, which is a diagram of a process 30 according to the embodiment of the present invention. The process 30 is utilized for handling reset in a first communications device of a wireless communications system. The first communications device can be a UE or network, and comprises a first transmitter and a receiver in its Layer 2 interface (such as RLC or PDCP). The process 30 can be compiled into the reset handling program code 220, and comprises the following steps:

Step 300: Start.
Step 302: Receive a PDU from a second communications device by the receiver.
Step 304: Trigger a reset procedure by the receiver when a protocol error is detected by the receiver according to the PDU.
Step 306: Reset the receiver and do not reset the first transmitter after the reset procedure is triggered.
Step 308: Finish.

According to the process 30, when the receiver of the RLC layer detects a protocol error, the embodiment of the present invention resets the receiver and does not reset the first transmitter. In other words, the first transmitter will not be affected by the reset procedure, and keep transmitting PDUs. As a result, the reset duration is reduced, and first transmitter can work normally, so as to enhance transmission efficiency and prevent unnecessary PDU discard.

Preferably, when the receiver triggers the reset procedure, the embodiment of the present invention can output a RESET REQUEST PDU to the second communications device, to request the second communications device to reset a second transmitting side of the second communications device and send a RESET PDU with a field indicating an HFN to be used by the second communications device in the next transmission. In such a situation, after the reset procedure is finished, the embodiment of the present invention reports a RESET ACK PDU, which does not contain a field indicating an HFN to be used by the first transmitter in the next transmission.

In addition, during the reset procedure, the embodiment of the present invention can preferably performs the following operations:

1. Stop receiving any data PDU.
2. Keep receiving control PDUs corresponding to the first transmitter, such as WINDOW SUFI (super field), MRW_ACK, RESET REQUEST PDU, and acknowledgment signals from the second communications device.
3. Discard acknowledgment signals corresponding to the receiver.
4. Stop a Timer_Status_Periodic timer and a Timer_Status_Prohibit timer, and keep other timers, such as a Timer_Poll timer, Timer_Poll_Prohibit timer, Timer_MRW timer, Timer_Discard timer and timers corresponding to the reset procedure.

Therefore, in the embodiment of the present invention, when the receiver of Layer 2 interface 206, such as an RLC or PDCP layer, detects a protocol error, only the receiver triggers the reset procedure, and the transmitter is not be reset. Meanwhile, after the receiver triggers the reset procedure, the embodiment of the present invention outputs the RESET REQUEST PDU to request the second communications device to reset the second transmitter thereof and send the RESET PDU. In other words, in the embodiment of the present invention, the receiver can trigger the reset procedure, and the transmitter needs not to be reset, so as to enhance transmission efficiency. In comparison, the prior art triggers the reset procedure only by the transmitter, and both the transmitter and the receiver are set during the reset procedure, causing time waste and data loss.

In short, via the process 30, when the receiver of the RLC layer detects the protocol error, the embodiment of the present invention resets the receiver and does not reset the transmitter of the RLC layer, so as to keep functions of the transmitter, and enhance transmission efficiency.

Figure 4:
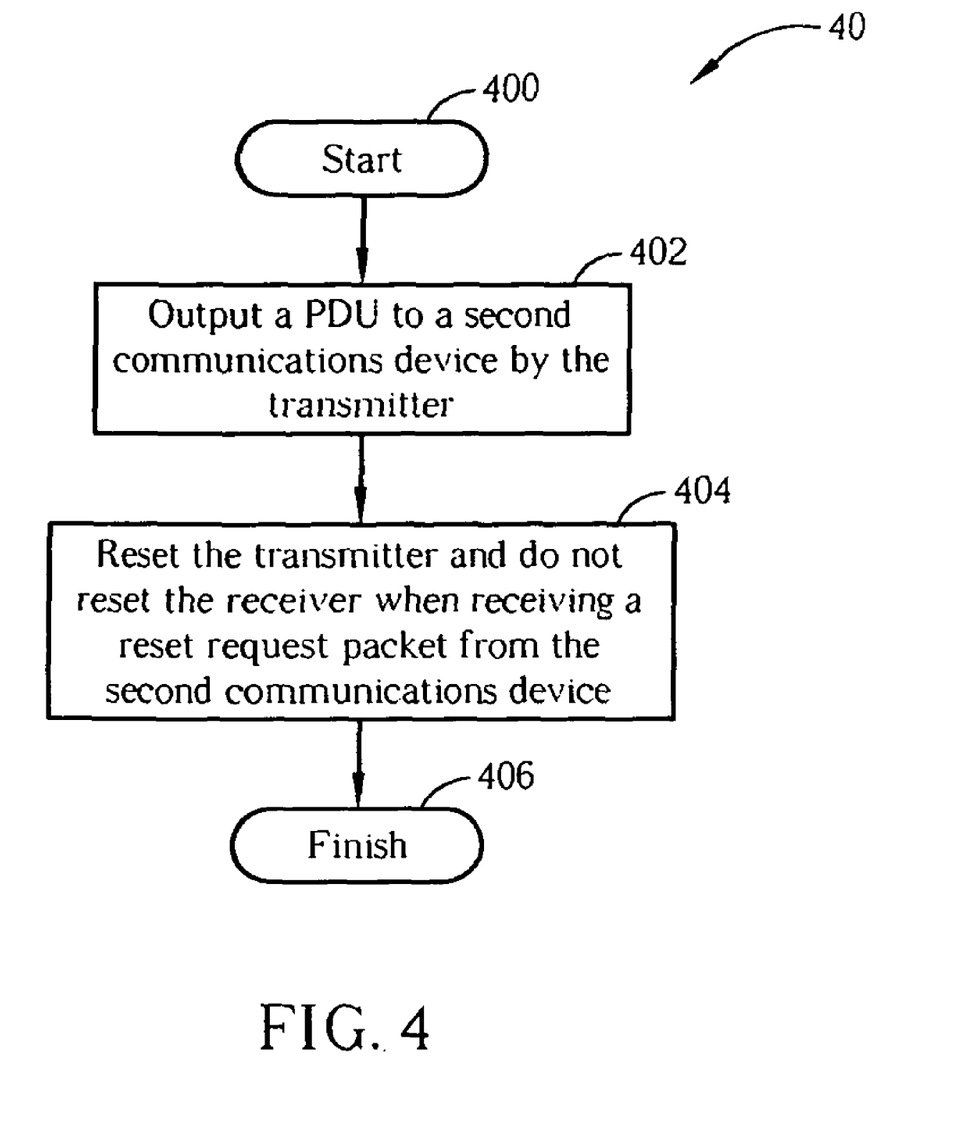
FIG. 4 is a flowchart of a process according to another embodiment of the present invention.

Please refer to FIG. 4, which is a diagram of a process 40 according to the embodiment of the present invention. The process 40 is utilized for handling reset in a communications device of a wireless communications system. The first communications device can be a UE or network, and comprises a transmitter and a receiver in its Layer 2 interface (such as RLC or PDCP). The process 40 can be compiled into the reset handling program code 220, and comprises the following steps:

Step 400: Start.
Step 402: Output a PDU to a second communications device by the transmitter.
Step 404: Reset the transmitter and do not reset the receiver when receiving a reset request packet from the second communications device.
Step 406: Finish.

The process 40 operates in coordination with the process 30. According to the process 40, if the transmitter receives a RESET REQUEST PDU from the second communications device when outputting a PDU, the embodiment of the present invention resets the transmitter and does not reset the receiver. In other words, the receiver will not be affected by the reset procedure, and can keep receiving PDUs. In such a situation, the reset duration is reduced, and receiver can work normally, so as to enhance transmission efficiency and prevent unnecessary PDU discard.

Preferably, according to the RESET REQUEST PDU outputted from the second communications device, the embodiment of the present invention can output a RESET PDU to indicate HFN to be used by the transmitter in the next transmission.

Therefore, via the process 40, when the second communications device detects the protocol error, the embodiment of the present invention resets the transmitter only and does not reset the receiver, so as to reduce the reset duration, and keep functions of the receiver, so as to enhance transmission efficiency, and prevent unnecessary PDU discard.

Figure 5:
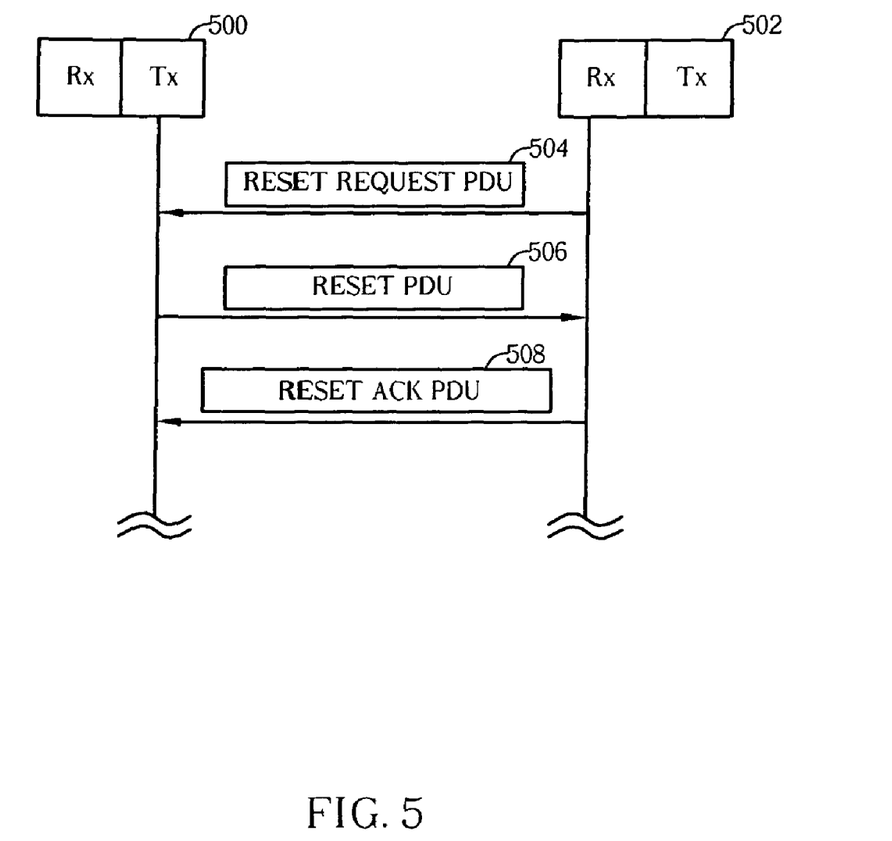
FIG. 5 is a schematic diagram of a reset procedure according to the processes shown in FIG. 3 and FIG. 4.

Please refer to FIG. 5, which is a schematic diagram of a reset procedure according to the processes 30 and 40. In FIG. 5, each of the communications devices 500 and 502 comprises a receiver Rx and a transmitter Tx. When the transmitter Tx of the communications device 500 transmits PDUs to the receiver Rx of the communications device 502, if the receiver Rx of the communications device 502 detects a protocol error, the receiver Rx of the communications device 502 sends a RESET REQUEST PDU 504 to trigger the reset procedure. After the communications device 500 receives the RESET REQUEST PDU 504, the transmitter Tx of the communications device 500 returns a RESET PDU 506 with a field indicating HFN to be used in the next transmission. After the communications device 502 receives the RESET PDU 506, the receiver Rx of the communications device 502 returns a RESET ACK PDU 508, which does not comprises a field indicating HFN to be used in the next transmission, to finish the reset procedure. Therefore, via the embodiment of the present invention, during the reset procedure, only the transmitter Tx of the communications device 500 and the receiver Rx of the communications device 502 are reset, and the receiver Rx of the communications device 500 and the transmitter Tx of the communications device 502 can keep normal operations, so as to enhance transmission efficiency.

In summary, when the receiver of the RLC layer detects protocol errors, the embodiment of the present invention only resets the receiver of the RLC layer and the transmitter of the peer RLC layer, so as to accurately handle the protocol errors, enhance transmission efficiency, and prevent unnecessary PDU discard.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for handing reset in a first communications device of a wireless communications system, the first communications device comprising a first transmitter and a receiver, the method comprising:
   receiving a packet from a second communications device by the receiver;
   triggering a reset procedure by the receiver when a protocol error is detected by the receiver according to the packet; and
   resetting the receiver and not resetting the first transmitter after the reset procedure is triggered
   wherein resetting the receiver and not resetting the first transmitter after the reset procedure is triggered comprises stopping a Timer_Status_Periodic timer and a Timer_Status_Prohibit timer.

2. The method of claim 1, wherein triggering the reset procedure by the receiver comprises outputting a reset request packet to the second communications device to request the second communications device to reset a second transmitting side of the second communications device and send a reset packet with a field indicating a hyper frame number to be used by the second communications device in a next transmission.

3. The method of claim 1, wherein resetting the receiver and not resetting the first transmitter after the reset procedure is triggered comprises stopping receiving any data packet.

4. The method of claim 1, wherein resetting the receiver and not resetting the first transmitter after the reset procedure is triggered comprises receiving control packets corresponding to the first transmitter.

5. The method of claim 1, wherein resetting the receiver and not resetting the first transmitter after the reset procedure is triggered comprises discarding acknowledgment signals corresponding to the receiver.

6. The method of claim 1 further comprising reporting a reset acknowledgment packet, which does not contain a field to indicate a hyper frame number to be used by the first transmitter in a next transmission.

7. The method of claim 1. wherein the first communications device is operated in an acknowledged mode.

8. The method of claim 1, wherein the first communications device is a user equipment.

9. The method of claim 1, wherein the first communications device is a network device.

10. A first communications device of a wireless communications system utilized for accurately handling reset comprising:
    a control circuit for realizing functions of the communications device;
    a processor installed in the control circuit for executing a program code to operate the control circuit; and
    a memory coupled to the processor for storing the program code;

wherein the program code comprises:
forming a first transmitter and a receiver;
receiving a packet from a second communications device by the receiver;
triggering a reset procedure by the receiver when a protocol error is detected by the receiver according to the packet; and
resetting the receiver and not resetting the first transmitter after the reset procedure is triggered
wherein resetting the receiver and not resetting the first transmitter after the reset procedure is triggered in the program code comprises stopping a Timer_Status_Periodic timer and a Timer_Status_Prohibit timer.

11. The first communications device of claim 10, wherein triggering the reset procedure by the receiver in the program code comprises outputting a reset request packet to the second communications device to request the second communications device to reset a second transmitting side of the second communications device and send a reset packet with a field indicating a hyper frame number to be used by the second communications device in a next transmission.

12. The first communications device of claim 10, wherein resetting the receiver and not resetting the first transmitter after the reset procedure is triggered in the program code comprises stopping receiving any data packet.

13. The first communications device of claim 10, wherein resetting the receiver and not resetting the first transmitter after the reset procedure is triggered in the program code comprises receiving control packets corresponding to the first transmitter.

14. The first communications device of claim 10, wherein resetting the receiver and not resetting the first transmitter after the reset procedure is triggered in the program code comprises discarding acknowledgment signals corresponding to the receiver.

15. The first communications device of claim 10, wherein the program code further comprises reporting a reset acknowledgment packet, which does not contain a field to indicate a hyper frame number to be used by the first transmitter in a next transmission.

16. The first communications device of claim 10 operated in an acknowledged mode.

17. The first communications device of claim 10 being a user equipment.

18. The first communications device of claim 10 being a network device.

* * * * *